(12) United States Patent
Shuster (10) Patent No.: US 10,148,905 B2
(45) Date of Patent: Dec. 4, 2018

(54) DIGITAL MEDIUM WITH HIDDEN CONTENT

(75) Inventor: Gary Stephen Shuster, Fresno, CA (US)

(73) Assignee: Intellectual Ventures I LLC, Wilmington, DE (US)

(*) Notice: Subject to any disclaimer, the term of this patent is extended or adjusted under 35 U.S.C. 154(b) by 1349 days.

(21) Appl. No.: 11/550,953

(22) Filed: Oct. 19, 2006

(65) Prior Publication Data

US 2007/0094679 A1 Apr. 26, 2007

Related U.S. Application Data

(60) Provisional application No. 60/728,482, filed on Oct. 19, 2005.

(51) Int. Cl.
| | |
|---|---|
| H04N 1/00 | (2006.01) |
| H04N 5/84 | (2006.01) |
| G11B 27/32 | (2006.01) |
| G11B 27/34 | (2006.01) |
| H04N 5/85 | (2006.01) |
| H04N 9/82 | (2006.01) |
| H04N 21/41 | (2011.01) |
| H04N 21/488 | (2011.01) |

(52) U.S. Cl.
CPC ............ *H04N 5/84* (2013.01); *G11B 27/329* (2013.01); *G11B 27/34* (2013.01); *H04N 9/8227* (2013.01); *A63F 2300/609* (2013.01); *G11B 2220/2562* (2013.01); *H04N 1/0087* (2013.01); *H04N 5/85* (2013.01); *H04N 9/8205* (2013.01); *H04N 21/4104* (2013.01); *H04N 21/488* (2013.01)

(58) Field of Classification Search
CPC ............ G11B 27/329; G11B 2220/2562; H04N 5/84; H04N 5/85; H04N 1/0087; A63F 2300/609
USPC ...... 715/700, 741, 854; 725/30, 31; 711/164
See application file for complete search history.

(56) References Cited

U.S. PATENT DOCUMENTS

| | | | |
|---|---|---|---|
| 6,385,388 B1* | 5/2002 | Lewis | G11B 27/105 380/201 |
| 6,802,000 B1* | 10/2004 | Greene et al. | 713/168 |
| 7,117,250 B1* | 10/2006 | Wu | 709/217 |
| 7,284,275 B2* | 10/2007 | Ogawa et al. | 726/26 |
| 7,574,117 B2* | 8/2009 | Green | G11B 20/00086 386/248 |
| 2001/0037459 A1* | 11/2001 | Ogawa | G06F 21/00 726/26 |
| 2002/0191950 A1* | 12/2002 | Wang | 386/46 |
| 2003/0007782 A1* | 1/2003 | Kamen | 386/83 |
| 2003/0009686 A1* | 1/2003 | Wu | G06F 12/1466 726/27 |

(Continued)

OTHER PUBLICATIONS

Guido Henkel, "The World of Easter Eggs on DVD", Aug. 12, 1998, DVD Review, pp. 1-2.*

*Primary Examiner* — Shen Shiau
(74) *Attorney, Agent, or Firm* — Meyertons, Hood, Kivlin, Kowert & gGoetzel, P.C.

(57) ABSTRACT

A digital medium such as a DVD disk, may contain hidden content and apparent content. When loaded, a main or title menu may appear to provide an apparent link to apparent content and a non-apparent link to non-apparent content. The non-apparent link may require a user to perform a sequence of non-apparent control actions before providing access to the non-apparent content.

8 Claims, 8 Drawing Sheets

(56) References Cited

U.S. PATENT DOCUMENTS

2003/0093699 A1* 5/2003 Banning et al. .............. 713/202
2003/0163549 A1* 8/2003 Neto .............................. 709/218
2006/0117158 A1* 6/2006 Shionoya ............... G06Q 90/00
　　　　　　　　　　　　　　　　　　　　　　711/164
2007/0100755 A1* 5/2007 Kragt et al. .................... 705/51

* cited by examiner

DIGITAL MEDIUM WITH HIDDEN CONTENT

CROSS-REFERENCE TO RELATED APPLICATION

This application claims priority pursuant to 35 U.S.C. § 119(e) to U.S. provisional application Ser. No. 60/728,482, filed Oct. 19, 2005, which application is specifically incorporated herein, in its entirety, by reference.

BACKGROUND OF THE INVENTION

1. Field of the Invention

Embodiments of the present invention may relate to organizing data on digital media, and/or to digital media products thus organized.

2. Description of Related Art

DVD and other digital media may be provided according to standards published by various organizations, such as the DVD Forum/the DVD Format/Logo Licensing Corporation. For example, currently standards for DVD content are published in books published by the DVD Forum, noted above. These standards permit digital content to be organized on DVD disks and equivalent digital media so as to provide access to principal content on the disk via menus, such as a "title menu." Most DVD disks are configured such that, after the disk is inserted into a media player, a title menu appears, often after some introductory messages are displayed, such as production credits, copyright notices, and/or advertising.

The title menu generally provides links to the principal disk content. For example, the menu may provide a link to play the main feature, a link for episode or chapter selection, and/or one or more links to bonus or auxiliary features. Title menus may be organized to be graphically appealing to the user and to provide convenient access to the content advertised on the DVD package.

Some DVD content may be configured to contain so-called "easter eggs," which are disguised links to certain content that is not accessible via the title menu. A purpose of the easter eggs is to provoke or maintain user interest in the DVD product by providing hidden treats. The easter eggs may be disguised as visual elements in one or more menus or other digital content. When an easter egg is "discovered" or activated via interaction with a cursor or other control element, a, typically short, segment of digital audio-visual content may be played. Thus, the user is motivated to discover the easter eggs to view additional content that is not otherwise accessible. However, the additional content may generally be related and auxiliary to principal digital content available via the title menu. Also, the presence of the easter eggs if often advertised so as to induce potential purchasers to buy the DVD product.

Current methods of formatting DVD products do not contemplate providing principal content in a hidden form. Providing such hidden content may be desirable, for example, for distributing confidential, secret, and/or age-restricted information, such that the presence of the hidden content is not apparent if the DVD disk is used by someone not authorized to view the hidden content.

SUMMARY OF THE INVENTION

Embodiments of the present invention may provide a DVD disk or other digital medium with apparent and non-apparent content. The apparent content may play upon insertion of the disk, or may be accessible via appropriately-labeled links on a menu screen. The non-apparent content may be hidden so as to not be accessible unless a specific sequence of links and/or code sequences are followed. The correct sequence of links or screens for code entry may be labeled so as to have no apparent relation to the hidden content.

BRIEF DESCRIPTION OF THE DRAWINGS

A more complete understanding of various embodiments of the invention will be afforded to those skilled in the art by a consideration of the following detailed description of the such embodiments in conjunction with the attached drawings in which:

FIG. 2, comprised of FIGS. 2A-2D, presents a block diagram showing how a digital medium according to an embodiment of the invention may contain various content;

DETAILED DESCRIPTION OF VARIOUS EMBODIMENTS OF THE INVENTION

Figure 1:
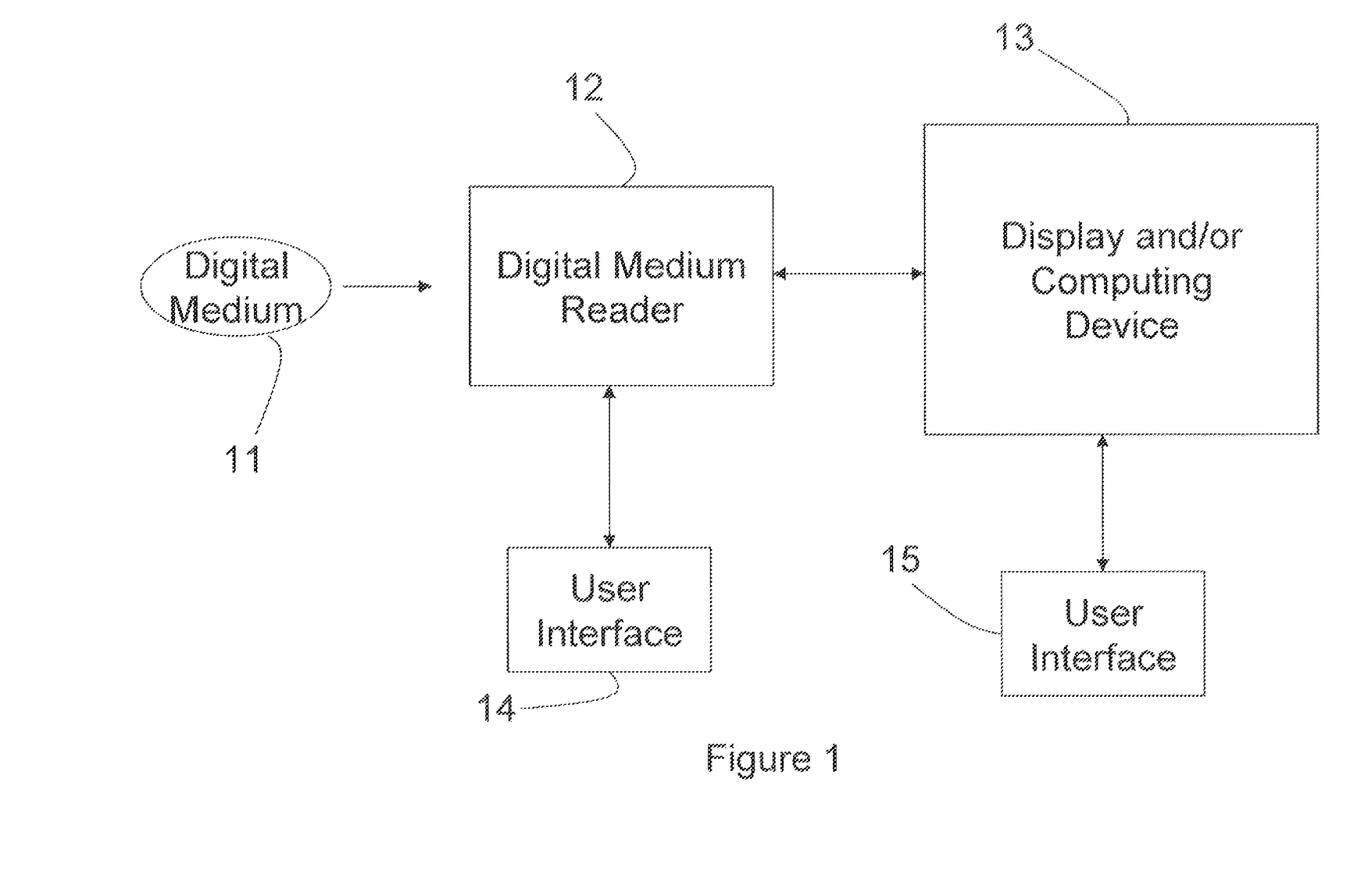
FIG. 1 shows a schematic diagram of a system for playing a digital media disk with hidden content, according to various embodiments of the invention.

FIG. 1 is a schematic diagram of a system for playing a digital medium that may contain hidden content. A digital medium 11 may be, for example, a DVD, an HD-DVD, a CD, a Blu-Ray disc, or any other medium in which digital media content may be encoded. Digital medium 11 may be remotely located, and digital content may be downloaded from digital medium 11 over a communication network, either interactively or in one or more batch downloads. Content stored on digital medium 11 may include passive content (i.e., content to be viewed), such as, but not limited to, movies, diagrams, blueprints, photographs, and the like, and may include content to permit interactive negotiation of the passive content, such as, but not limited to, menu-based systems, as will be discussed further below.

Digital medium 11 may be inserted into an appropriate apparatus 12 for reading the digital medium 11. As an example, to which the invention is not limited, if digital medium 11 is a DVD, digital medium reader 12 may be a DVD player or a DVD drive in a computer. The digital medium reader 12 may be coupled to a display and/or computing device 13. The system of FIG. 1 may further include one or more user interface devices 14, 15. Such user interface devices may be used for, but are not necessarily limited to, selecting from menus presented from the digital medium 11. As such, a user interface device 14 or 15 may include, for example, a mouse, a keyboard, a keypad, or a remote controller (e.g., containing numerical and/or non-numerical keys). A user interface device 14, 15 may be directly coupled to digital medium reader 12 or display and/or computing device 13, or it may be remotely connected.

Figure 1A:
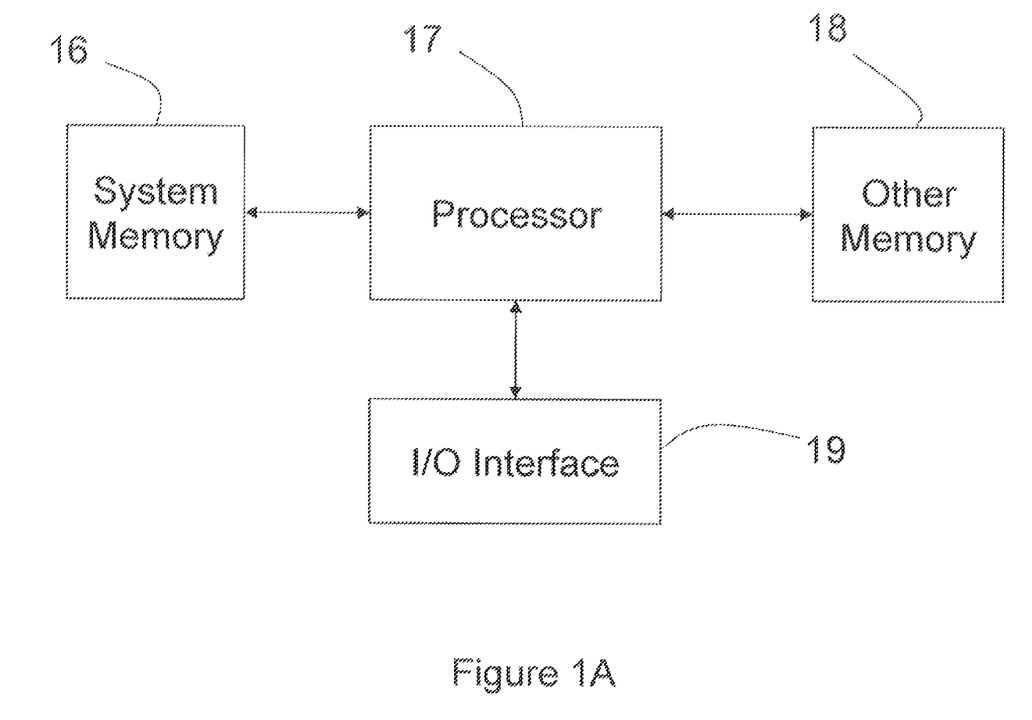
FIG. 1A, shows a block diagram of a system that may be used a part of the system of FIG. 1, or which may incorporate a system like that shown in FIG. 1, according to various embodiments of the invention.

FIG. 1A shows a conceptual block diagram of a computing system that may be used to implement part of the system of FIG. 1, or which may incorporate the system of FIG. 1.

Such a computing system may include one or more processors 17, which may be coupled to one or more system memories 16. Such system memory 16 may include, for example, RAM, ROM, or other such processor-readable media, and system memory 16 may be used to incorporate, for example, a basic I/O system (BIOS), operating system, instructions for execution by processor 17, etc. The system may also include further memory 18, such as additional RAM, ROM, hard disk drives, or other processor-readable media. Processor 17 may also be coupled to at least one input/output (I/O) interface 19. I/O interface 19 may include one or more user interfaces, as well as readers for various types of storage media and/or connections to one or more communication networks (e.g., communication interfaces and/or modems), from which, for example, software code may be obtained.

Figure 2A:
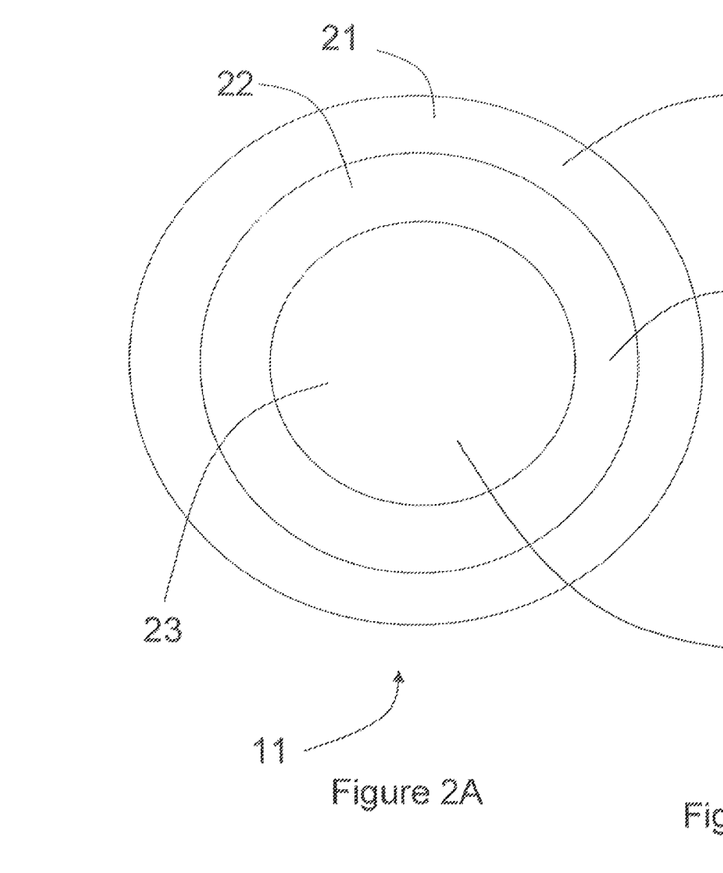
Figure 2B:
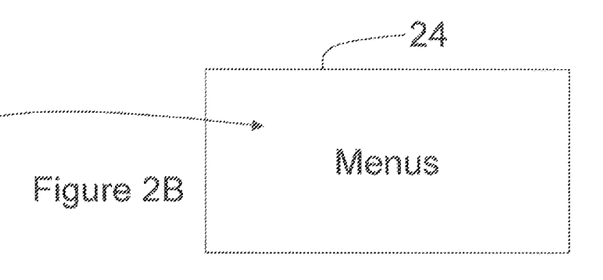
Figure 2C:
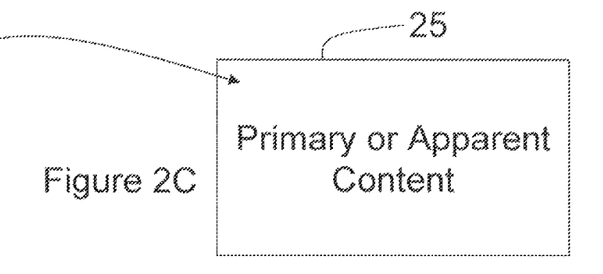

FIG. 2, comprised of FIGS. 2A-2D, shows a schematic diagram of an exemplary digital medium 11 according to an embodiment of the invention. A digital medium 11, as shown in FIG. 2A, in general, may include software instructions or other encoded information to be read and/or executed by a corresponding device that is capable of reading or executing the information from digital medium 11. The information on a digital medium 11, according to various embodiments of the invention, may be organized in many ways, an example of which is shown in FIG. 2. In FIG. 2, a portion 21 of digital medium 11 may contain instructions to present one or more menus 24 to a user, as shown in FIG. 2B, so that the user may make one or more selections from the one or more menus 24. Another portion 22 of the digital medium 11 may further contain "primary" or "apparent" content 25, as shown in FIG. 2C. The primary content 25 may, for example, but not necessarily, correspond to the principal content of a DVD containing easter eggs, as described above. For example, the digital medium 11 could be packaged with a cover that indicates that it contains a documentary about a "UFO Attack On Washington, D.C." This documentary may comprise the apparent (or "primary") content; this may be the content that may be presented to a user upon initial access of the digital medium 11.

Figure 2D:
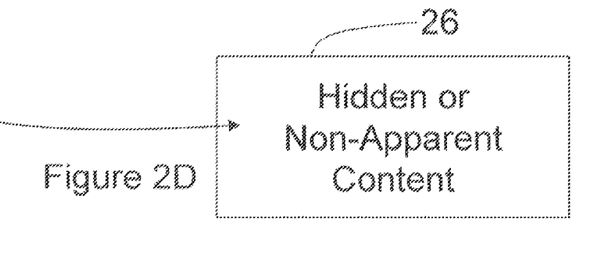

A further portion 23 digital medium 11 may contain "hidden" or "non-apparent" content 26. This content may not be accessible to a user unless one or more menus or other encoding schemes are properly negotiated. For example (to which the invention is not intended to be limited), digital medium 11 may, in addition to apparent content, e.g., as discussed above, contain the "Secret Business Plan of Company X," which may be the non-apparent content. In an exemplary embodiment, if a correct menu sequence is not followed, the user may be directed to the apparent content and away from the non-apparent content, whereas if such a correct menu sequence is followed, the user may be granted access to the non-apparent content.

Figure 3A:
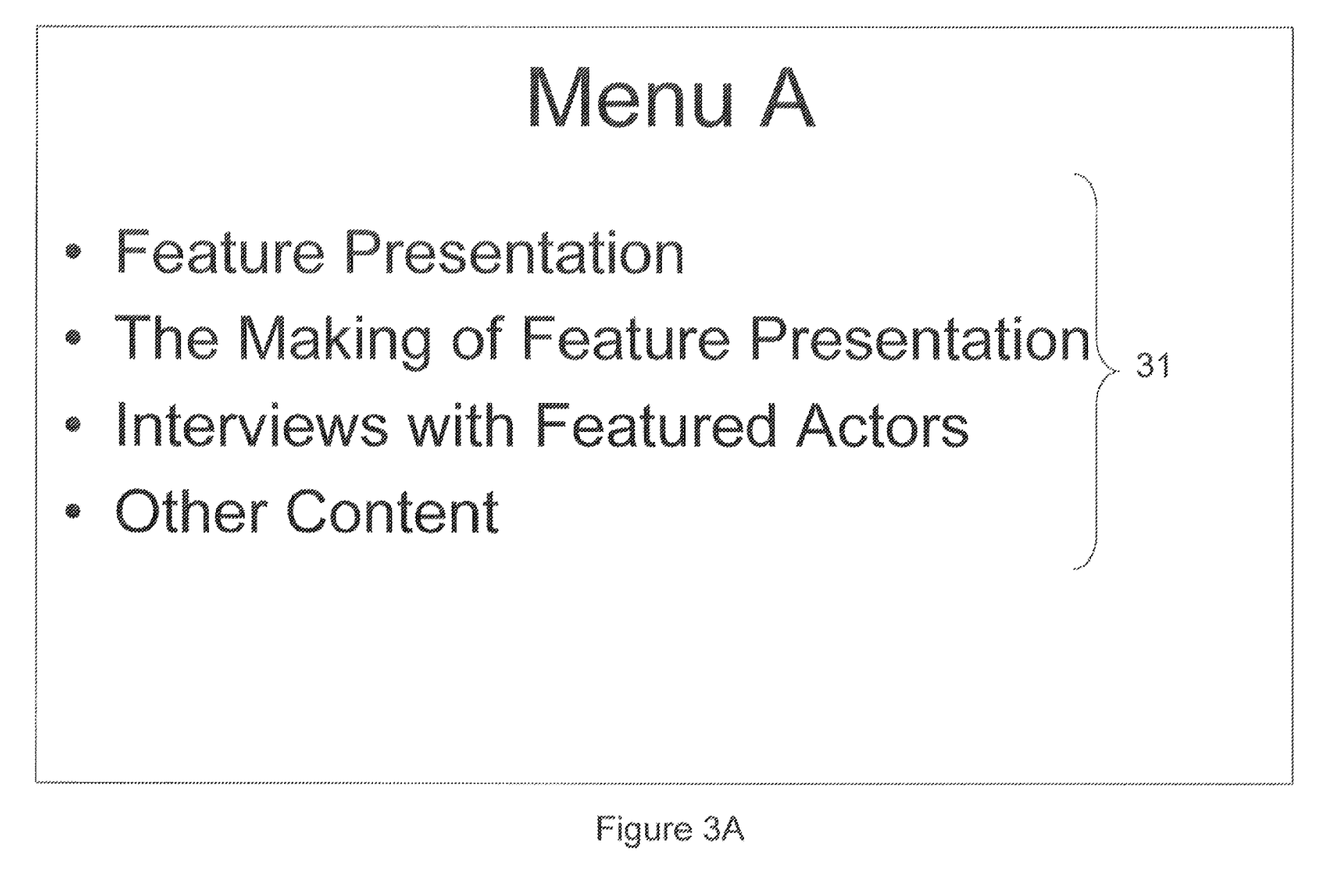
FIGS. 3A-3D are diagrams showing exemplary menu screens according to an embodiment of the invention.
Figure 3B:
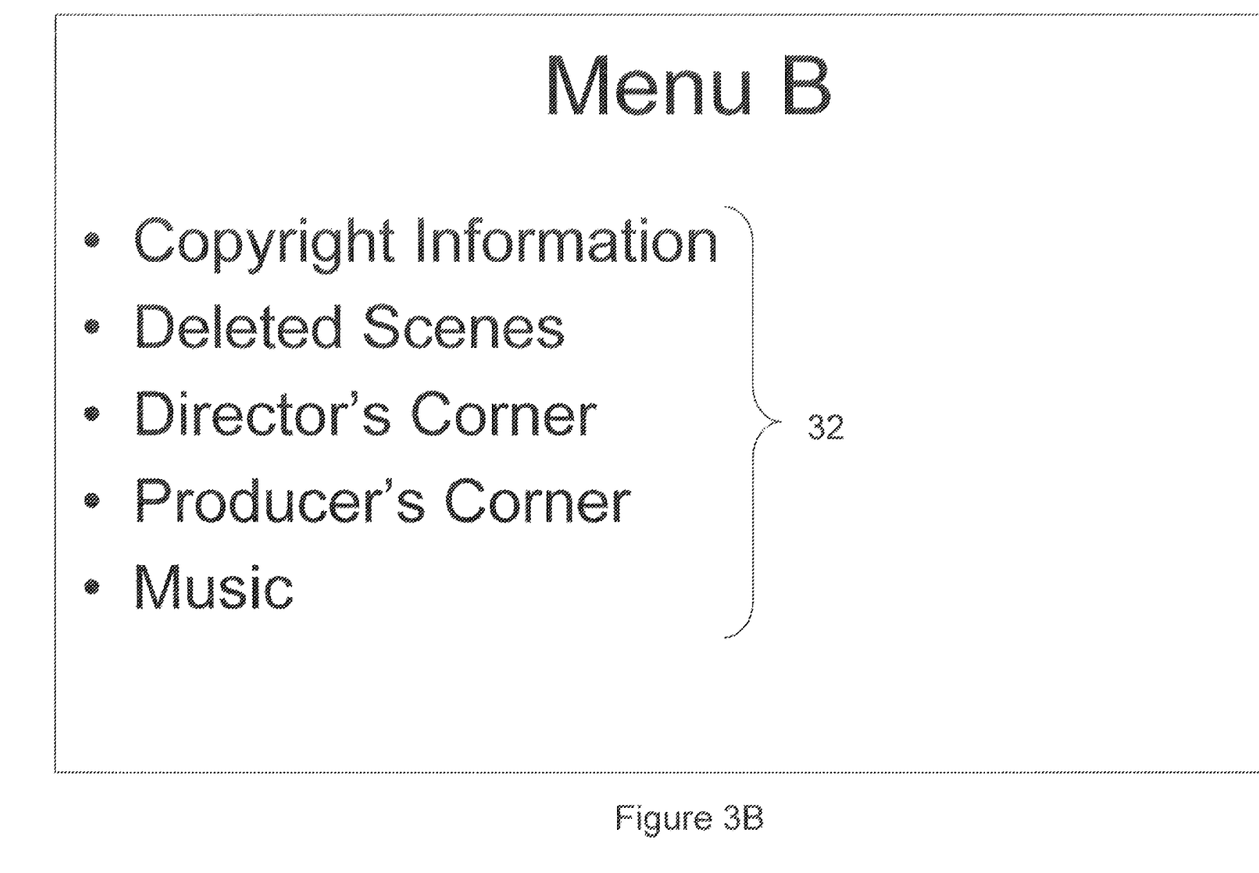
Figure 3C:
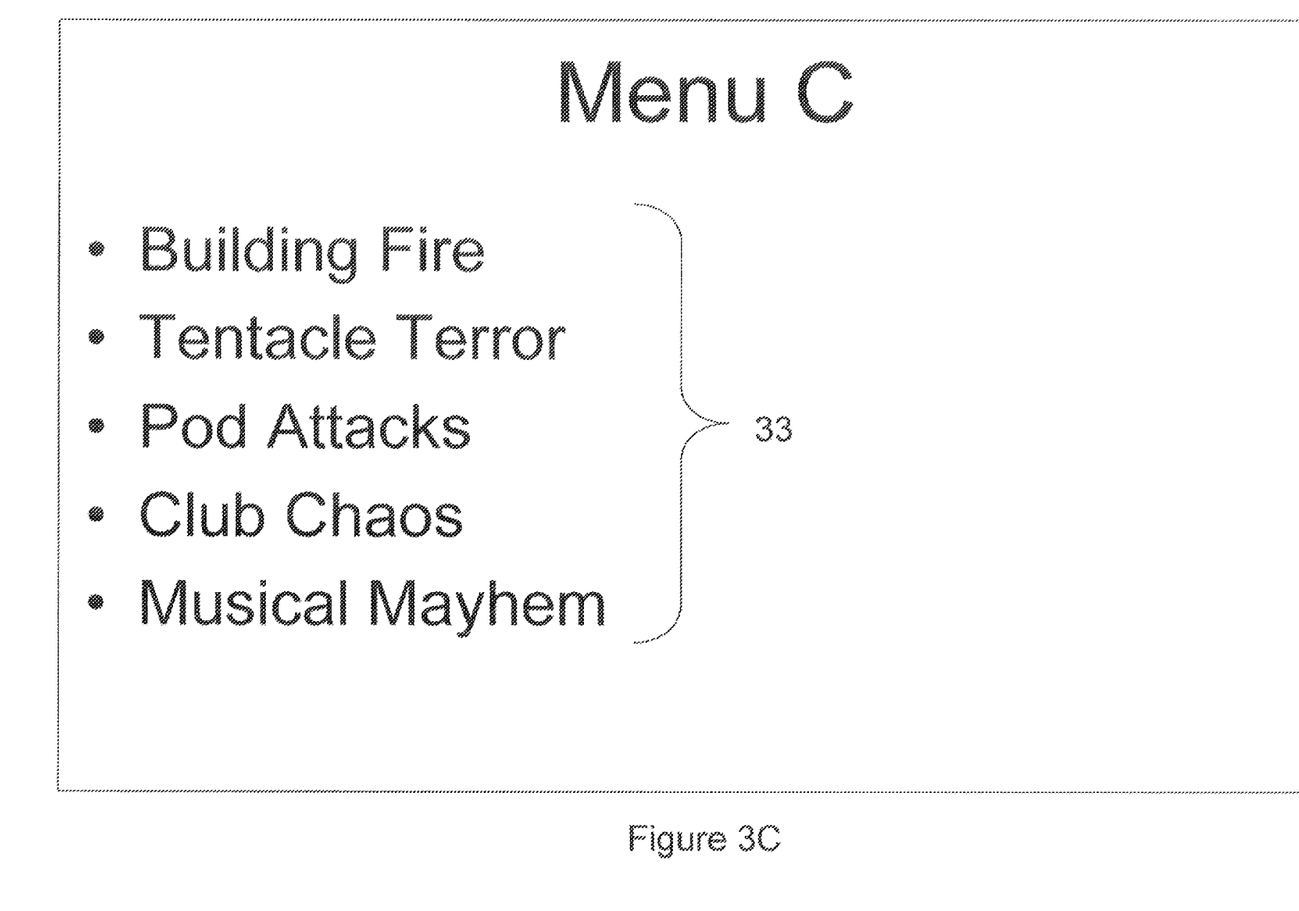
Figure 3D:
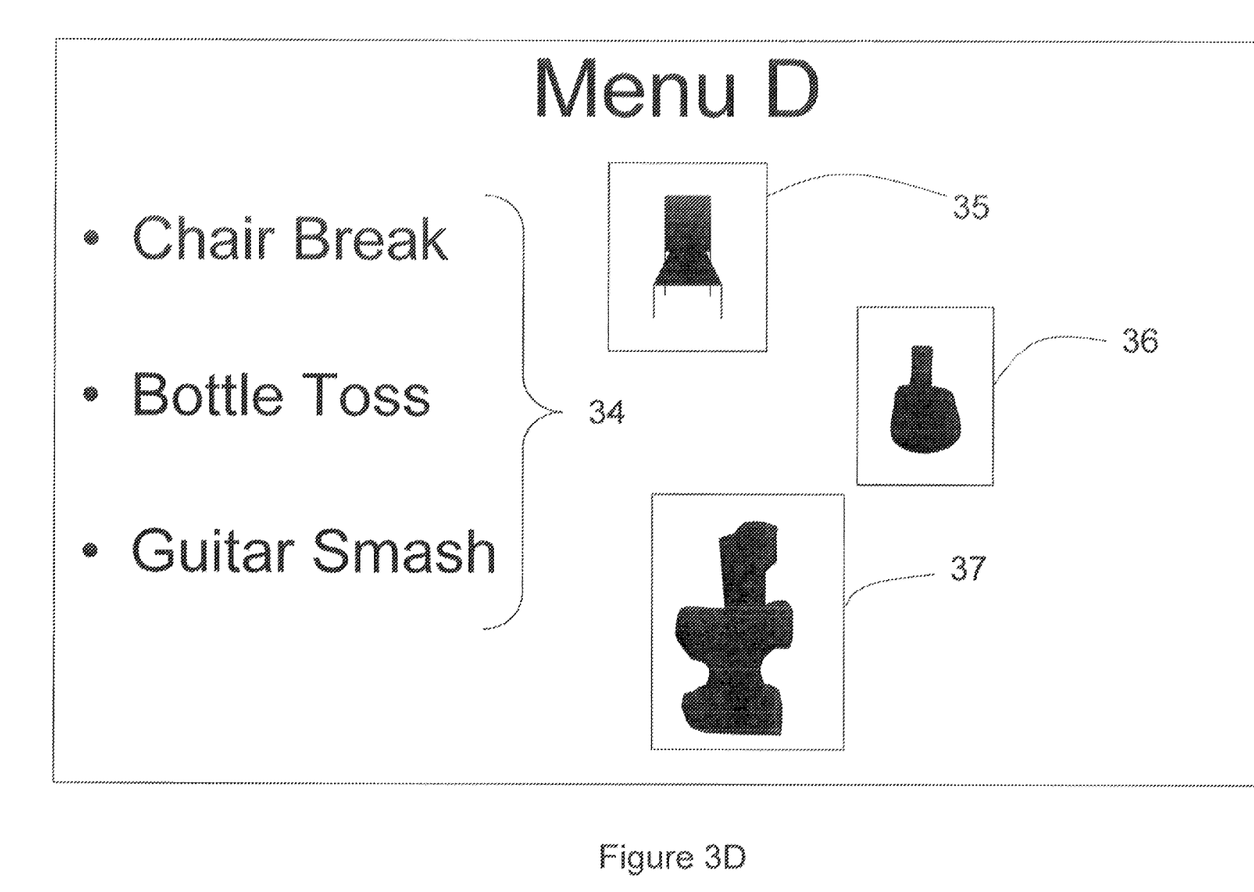

FIG. 3A-3D are conceptual diagrams showing exemplary menu screens according to an embodiment of the invention. As discussed above, in some embodiments of the invention, a user may navigate a sequence of menus in a particular way in order to access the non-apparent content. For example, to access the hidden content, in Menu A, shown in FIG. 3A, the user may need to select "Other Content" from among the various menu items 31. Selecting "Other Content" may then bring the user to Menu B, shown in FIG. 3B. Menu B may include a number of menu items 32, from which, for example, if the user chooses "Deleted Scenes," the user may then see Menu C, shown in FIG. 3C. FIG. 3C may contain menu items 33. As an example, should the user select "Club Chaos," the user may then see Menu D, as shown in FIG. 3D. Menu D may include, for example, menu items 34. If the user then selects a particular menu item, for example, "Guitar Smash," that may then permit the user to access the hidden content. Alternatively or additionally, a menu, such as, but not limited to, Menu D, may contain non-alphanumeric items, such as icons 35, 36, 37, and if the user knows to select the proper icon, that may lead the user to the hidden content. Alphanumeric and/or non-alphanumeric items may be used in any or all of the menus.

As an alternative to the menu-based system of FIGS. 3A-3D, in which the choices for selecting may be apparent to any user, in a further embodiment of the invention, the system may require the user to select a hidden icon to gain access to the non-apparent menu system. For example, by moving a cursor around title menu screen, or any other menu screen, it may be possible to highlight a link element or icon that appears to be an inoperative graphic element, for example, an image of a man's foot. If the user selects the foot, this may permit access to the hidden content, or may alternatively, bring the user to another innocuous-appearing menu (which may contain alphanumeric and/or non-alphanumeric items) or to a page full of code sequences, such as numeric codes.

If a page full of code sequences is used, the user may be asked to select a particular combination of numbers or other alphanumeric symbols or sequences in order to gain access to the hidden content. In one embodiment, the user may be required to select all of the numbers or symbols from the same page. In another embodiment, the numbers or symbols may be on successive pages or menus. For example, if the combination is 20-25-93-12-30, the user may be required to successfully navigate five different menu pages of numbers, selecting the correct number each time to move forward. In such an example, if all code pages were to be successfully navigated, the user may then be presented with access to the hidden content.

Thus, various embodiments of the invention may utilize one or more menus and/or code pages, which may be navigated sequentially (in the case of more than one), and these menus and/or code pages may contain alphanumeric and/or non-alphanumeric items and/or hidden items.

In addition, or in the alternative, code entry may be accomplished by directly entering a numeric or alphanumeric code using a remote control device or other user interface device 14, 15. A screen for entering the code may, for example, be accessed via one or more menus that may, e.g., be hidden and/or accessed in one of the ways discussed above.

Any of the embodiments discussed herein may optionally be set up to lock out a user, for example, requiring ejection and re-insertion (or other appropriate form of reloading) of the digital medium before non-apparent content can be viewed, if a user makes an incorrect entry in negotiating the process of attempting to access the non-apparent content. In the alternative, or in addition, the digital medium may be formatted to cause unrelated apparent content to be played if the correct menu sequence is not followed. Furthermore, in the latter case, the user may optionally be prevented from having the ability to fast-forward or skip through the unrelated apparent content. Optionally, if the system is not successfully navigated to access the hidden content, the user may be given one or more additional chances before being directed away from the non-apparent content.

Optionally, the hidden content may be cued to permit selection of a menu or title key on a remote control, or some other key or sequence on a user interface device 14, 15, to cause an immediate return to an innocuous title menu or to some part of the apparent content. In addition, the content may be configured to automatically begin playing the innocuous apparent content if the system is idle for a period of time, or after the non-apparent content has finished playing.

Packaging and labeling for the digital medium may be configured such that the presence of hidden content is not indicated. Optionally, the packaging may contain a coded hint as to a password or menu sequence to be used to unlock the hidden content.

One application for the invention may include the distribution of age-restricted content, for example, adults-only content. If a disk according to an embodiment of the invention is accidentally left in the presence of a child, the child may be prevented from accessing, or even knowing of, the existence of the hidden adult content. For such application, the apparent content may be selected so as to not appear interesting to children.

The label on the packaging of the digital medium and/or on the digital medium itself may be configured so as to discourage interest in playing the disc, for example, by indicating its contents to be something of very limited interest. In some embodiments, the packaging, the digital medium, a communication network-accessible site, or accompanying materials may contain password clues to assist in reminding the user how to access the non-apparent content.

Figure 4:
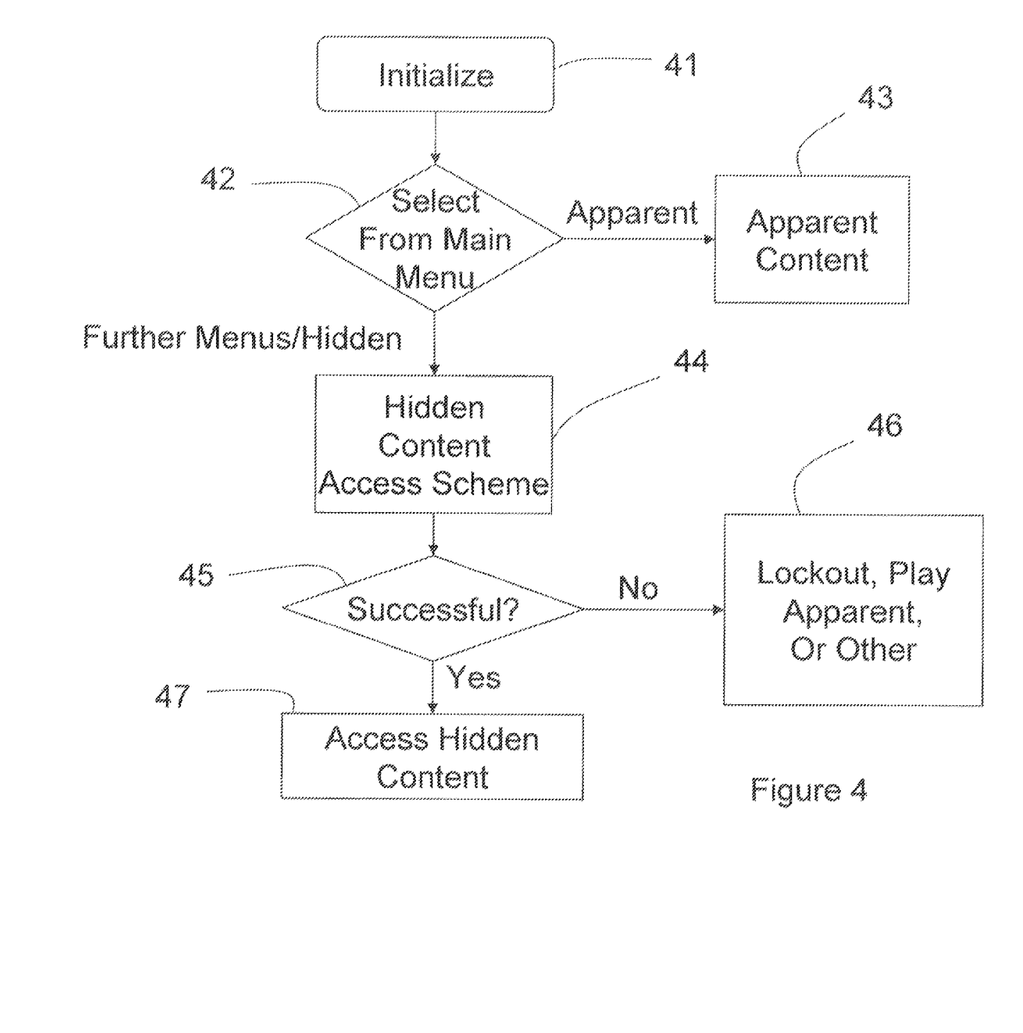
FIG. 4 is a flowchart showing exemplary steps of a method according to an embodiment of the invention.

FIG. 4 is a flow chart showing exemplary steps of a method according to an embodiment of the invention. When the digital medium 11 is loaded, an initialization 41 may begin. This may include the loading itself, e.g., if the digital medium is remotely located and the content is downloaded. As noted above, a user may initially be presented with a main menu and asked to make a selection 42. A user may select the apparent content, in which case the apparent content may be accessed 43. The user may, however, select to access further menus or code pages, as discussed above, which may be used to access hidden content 44. The user may then attempt to negotiate the hidden content access scheme 44, 45. If successful, the user may then be permitted to access the hidden content 47. If unsuccessful, the user may be locked out, may only be permitted to access the apparent content, or some other result may occur 46, as discussed above.

Various embodiments of the invention have now been discussed in detail; however, the invention should not be understood as being limited to these embodiments. It should also be appreciated that various modifications, adaptations, and alternative embodiments thereof may be made within the scope and spirit of the present invention. Consequently, the scope of the invention is defined by the attached claims.

What is claimed is:

1. A non-transitory computer-readable medium containing machine readable instructions that, in response to reading by a computing system, cause the computing system to perform operations comprising:

presenting an interface to a user, wherein the interface includes a plurality of menus that specify availability of apparent content stored on the computer-readable medium, wherein the computer-readable medium stores hidden non-apparent content accessible via a particular sequence of commands made through the interface, wherein none of the plurality of menus specify availability of the non-apparent content; and in response to determining that the particular sequence of commands has not been correctly followed:

directing the user away from the non-apparent content to the apparent content; and preventing the user from fast-forwarding through the apparent content.

2. The computer-readable medium of claim 1, wherein the particular sequence of commands includes entering a code sequence of alphanumeric characters.

3. The computer-readable medium of claim 1, wherein the particular sequence of commands includes selections of one or more menu items.

4. The computer-readable medium of claim 1, wherein the non-apparent content is the principal content of the computer-readable medium.

5. A method, comprising:

a media player device presenting, to a user, a plurality of menus that specify availability of apparent content stored on a digital medium, wherein the digital medium further stores hidden content accessible via a particular sequence of commands performed via the plurality of menus;

the media player device determining that the particular sequence of commands has not been properly performed; and in response to the determining:

the media player device directing the user away from the hidden content to the apparent content; and the media player device preventing the user from skipping through the apparent content.

6. The method of claim 5, wherein the particular sequence of commands is performed using a movable cursor.

7. The method of claim 5, wherein the digital medium is remotely located with respect to the media player device, and wherein the method further comprises: the media player device downloading at least the hidden content via a communication network.

8. The method of claim 5, wherein the hidden content is the principal content of the digital medium.

* * * * *